Nov. 25, 1969 — R. I. GENIN — 3,479,918
MUSICAL TYPEWRITER
Filed Jan. 5, 1967 — 3 Sheets-Sheet 1

INVENTOR.
ROBERT I. GENIN
BY
ATTORNEY

Nov. 25, 1969   R. I. GENIN   3,479,918
MUSICAL TYPEWRITER
Filed Jan. 5, 1967   3 Sheets-Sheet 2
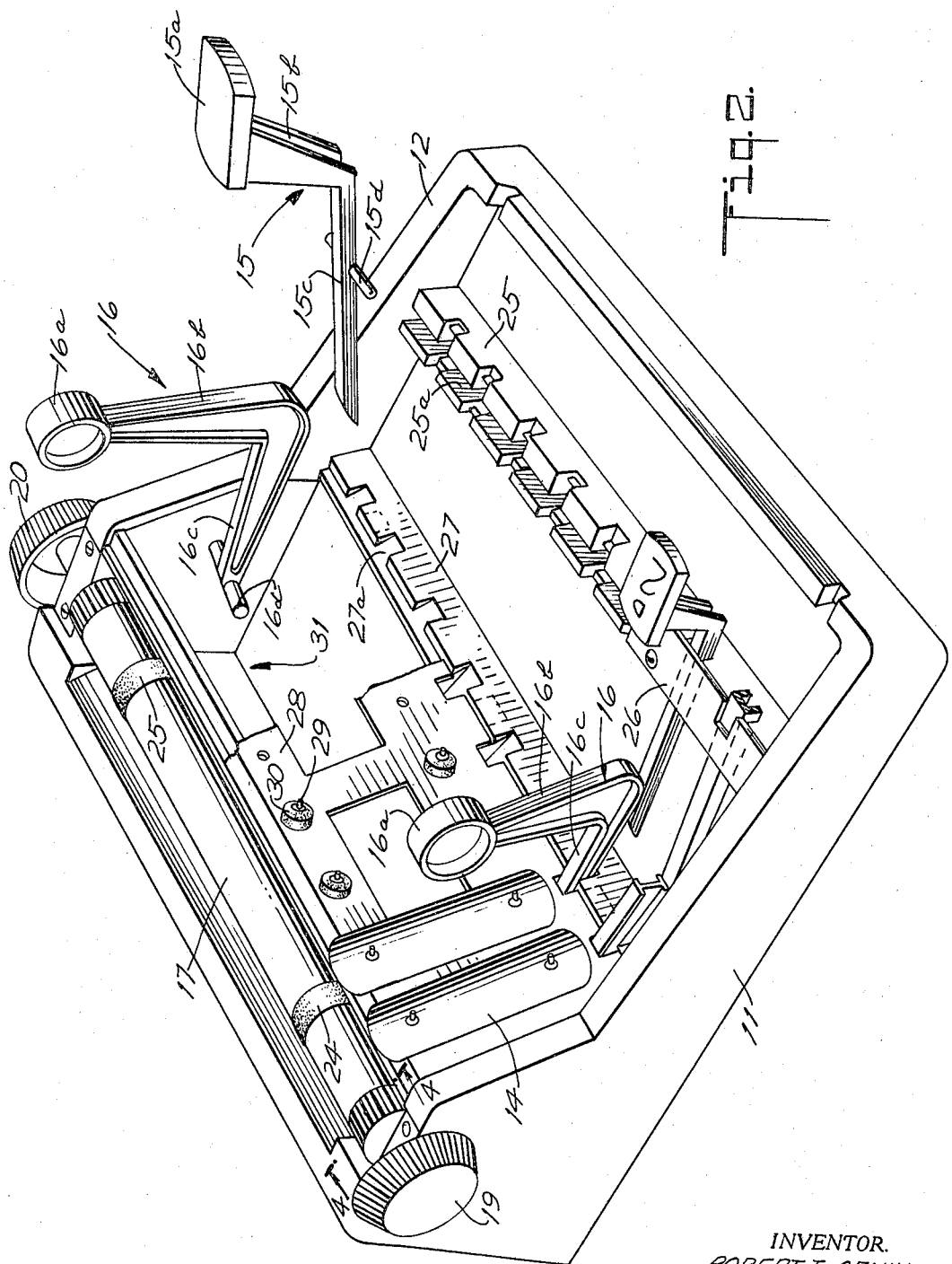
Fig. 2
INVENTOR.
ROBERT I. GENIN
BY 
ATTORNEY

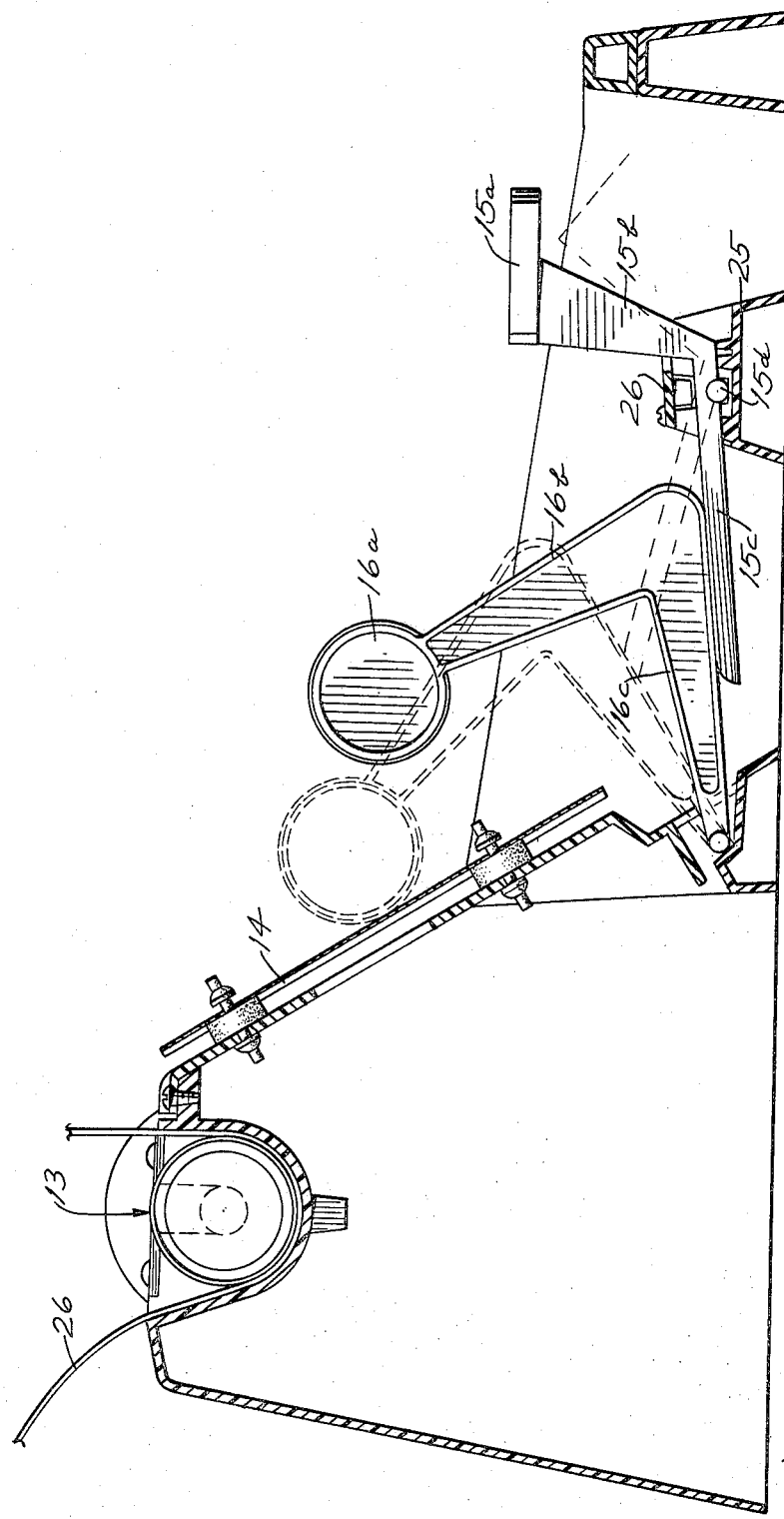

United States Patent Office 3,479,918
Patented Nov. 25, 1969

3,479,918
MUSICAL TYPEWRITER
Robert I. Genin, Scarsdale, N.Y., assignor to Child Guidance Toys Inc., New York, N.Y., a corporation of New York
Filed Jan. 5, 1967, Ser. No. 607,457
Int. Cl. G10d 13/08
U.S. Cl. 84—404             5 Claims

ABSTRACT OF THE DISCLOSURE

A musical typewriter in which a row of xylophone bars of varying length are supported on a frame in front of a roller which receives a music instruction sheet having notes thereon identified by a predetermined code, the bars being struck by clappers operated by a row of keys having code indicia thereon, whereby a player reading the coded notes is able to strike the appropriate keys to play the music on the sheet.

---

This invention relates generally to musical instruments, and more particularly to an instrument having xylophone bars which are played on a typewriter-like keyboard.

In many ways, the instrument which is most easily understood and mastered by a musically untrained child, is the xylophone. This instrument consists essentially of a row of bars graduated in length, so that when struck, each bar produces a distinct tone of the scale. To play a particular tune, the bars must be struck in an appropriate sequence indicated by printed notes on a music sheet. A child will ordinarily experience difficulty in reading notes, even in elementary form, and in relating these notes to the xylophone bars.

Accordingly, it is the main object of this invention to provide a typewriter-like instrument which is easily played and which includes xylophone bars played by means of a manual keyboard having symbols thereon representative of the notes of a scale.

More specifically, it is an object of this invention to provide an instrument having a row of manual keys and a corresponding row of xylophone bars operating in conjunction with a row of clappers, such that when a key is depressed the associated clapper is caused to strike a musical bar.

Also an object of the invention is to provide an instrument of the above-described type, having a typewriter roller for rolling-in and displaying an instructional music sheet whereby the player at the keyboard is able, without difficulty, to observe the notes to be played and effectively to type a tune.

In a preferred embodiment of the invention, each key and bar is color-coded and numbered to match the notes on the roll-in instruction sheet, so that each note on the staff is identifiable by conventional musical notation as well as by a particular letter, number and color. In this manner, the child is able to immediately relate each and every note on the sheet to an identically coded key and bar. Since the child finds himself able to choose and to play simple tunes with virtually no prior practice, he is encouraged to acquire greater mastery and to take on more difficult musical assignments.

A significant feature of the invention resides in the fact that the clappers are not mechanically linked to the keys and, once activated, operate freely so that when a given key is tapped, the associated clapper is caused to strike its related bar and to retract immediately therefrom, thus producing a clear, undamped tone.

While the instrument in accordance with the invention provides musical pleasure for the child, it also promotes digital dexterity as well as making it possible for the young player to create his own compositions and musical effects.

For a better understanding of the invention, as well as other objects and further features thereof, reference is made to the following detailed description to be read in conjunction with the accompanying drawing, wherein:

FIG. 2 is a view of the instrument with most of the keys and clappers removed to expose the mounting for the xylophone bars;

FIG. 3 is an exploded view showing the roller;

FIG. 4 is a transverse section taken through the roller; and

FIG. 5 is a transverse section taken through the instrument, one of the activated clappers being shown in its various operative positions.

Figure 1:
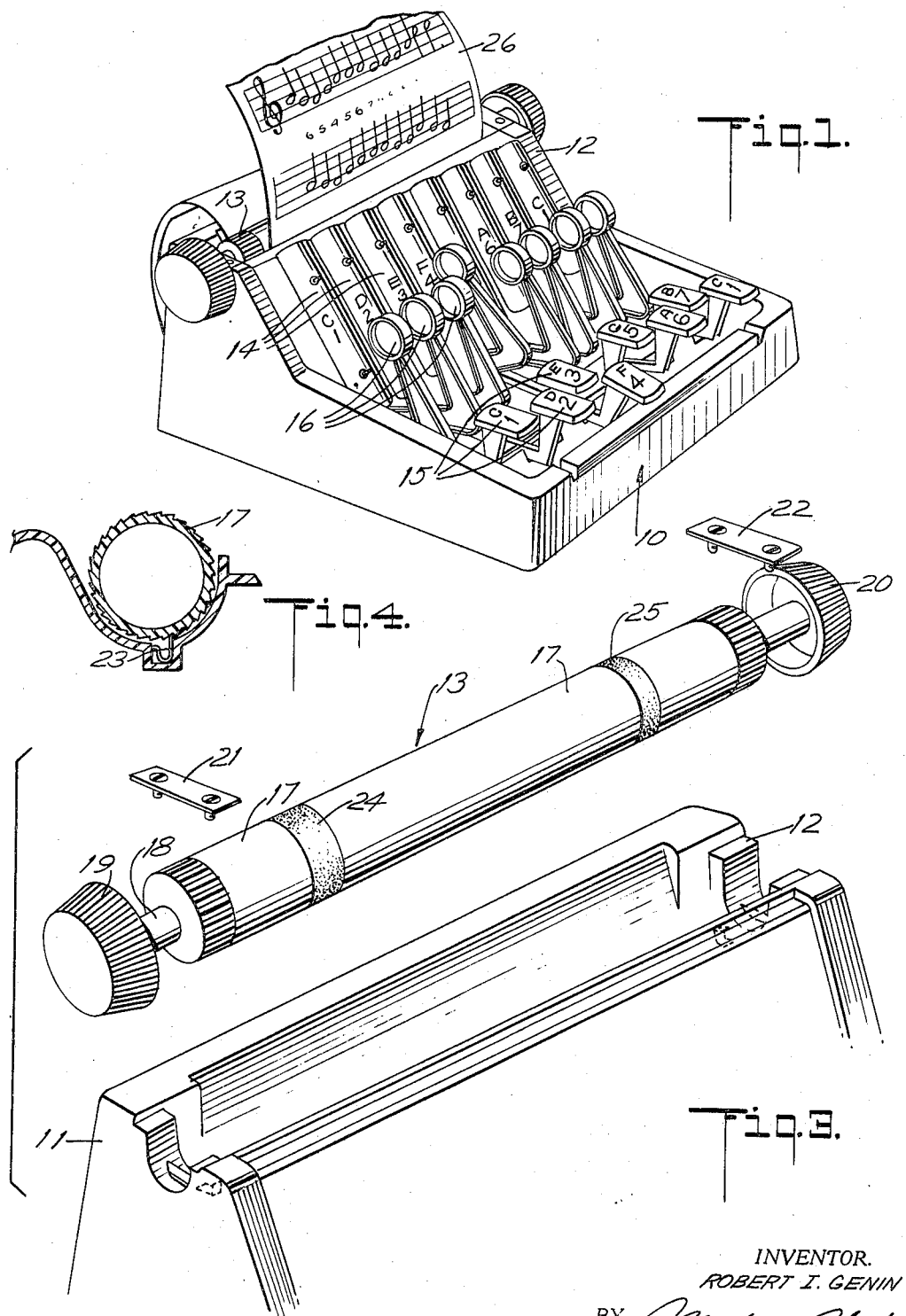
FIG. 1 shows in perspective, a musical typewriter in accordance with the invention.

Referring now to the drawing, the instrument in accordance with the invention has the appearance of a typewriter, and includes a rectangular frame, generally indicated by numeral 10, having a pair of parallel side walls 11 and 12 having triangular extensions 11a and 12a adjacent the rear wall for supporting a roller 13. Mounted at an inclined position within the frame adjacent the roller is a row of xylophone bars 14 of progressively varying length. In the embodiment shown, the row consists of eight bars forming an octave.

The keyboard for the instrument is constituted by a row of keys 15, each of which is adapted to activate a clapper 16 in a row thereof interposed between the tone row and the key row, such that when a given key is tapped, the associated clapper strikes the corresponding bar.

As best seen in FIGS. 3 and 4, roller 13 consists of a cylindrical roll 17 coaxially mounted on a shaft 18, manually operable knobs 19 and 20 being connected to the ends of the shaft. The end portions of shaft 18 are received in U-shaped recesses formed in the triangular portions of side walls 11 and 12. The roller operates within a trough extending between the side walls is retained on the frame by means of locking strips 21 and 22 which close the U-shaped recesses.

The end sections of cylindrical roll 17 are serrated, the teeth thereof being engaged by a detent 23 of spring metal, as shown in FIG. 4, to resist turning of the rollers and thereby to hold an inserted music sheet at a desired position. A pair of friction bands 24 and 25 encircle roll 17 at spaced positions thereon to engage a music instruction sheet 26 which is rolled in and displayed to the player, very much in the fashion in which a work sheet is inserted in a conventional typewriter.

Each key 15, as best seen in FIG. 2, is constituted by a finger pad 15a attached to the leg portion 15b of a lever having a foot portion 15c. The keys are pivotally supported on a bridge 25 having a longitudinal channel 25a therein and extending athwart side walls 11 and 12. Bridge 25 has a series of equi-spaced notches thereon to accommodate the foot portions 15c of the keys, each foot portion being provided with a cross-pin 15d. These pins are received within channel 25a of the bridge and are held therein by means of a locking strip 26 secured to the top of the bridge.

Each clapper 16 is constituted by a drum-shaped hammer 16a attached to one end of an L-shaped arm 16b whose forearm portion 16c terminates in a cross-pin 16d. Pin 16d is received in the longitudinal channel 27a of a slotted bridge member 27. The foot portion 15c of each key lies under the forearm portion 16c of the arm of the associated clapper, hence when the key is depressed the foot thereof is raised and the clapper is caused to swing upwardly.

Bars 14 are suspended from an inclined mounting plate 28 provided with an upper and lower stud 29, each of which is anchored in a ring 30 of rubber or similar material. Each of the bars is provided with a pair of spaced holes to receive a corresponding pair of studs, the bar resting against the rubber rings.

It is to be noted that the mounting plate 28 extends between the leading edges of the side wall extensions 11a and 12a of the frame and is provided with rectangular windows exposing the rear of the xylophone bars mounted thereon. Since the typewriter will ordinarily be placed on a table or the floor, the open bottom of the frame will be enclosed thereby. Thus a resonator chamber 31 is formed behind the mounting plate, which chamber is defined by the rear wall of the frame in conjunction with the triangular portions 11a and 12a of the side walls. This chamber serves to reinforce the sound produced when striking the bars.

It is to be noted that bars 14 are each identified by a letter and a number. As shown, the indicia on the bars are successively C-1, D-2, E-3, F-4, G-5, A-6, B-7, C-1, thus providing a full octave. While it is not evident in the black-and-white figures, each bar is given a distinctive color, and in practice, the bars may be successively colored yellow, green, orange, blue, etc. The same set of colors appears on the finger pads of the keys.

In the music instruction sheet, the notes appearing on the staff are given colors, in accordance with the above-described code, so that the reader will be able readily to correlate the position of a note on the staff with the proper bar and key. Below each note on the staff is the proper number. This arrangement greatly facilitates performance, for the child reading a note, sees not only its position on the staff, but sees it also in terms of color and number. Since children lacking musical training generally understand numbers, and certainly have a color sense, they are able at the outset to play notes using the color and number code, and can in time acquire a knowledge of notation without such assistance.

When tapping a key, an impulse is applied to the clapper arm which causes the head thereon to rise and strike a bar and to fall back to permit the bar to sound a sustained tone. The player by lightly or strongly tapping the key can control the loudness of the sound produced. It will be apparent that minimal skill is involved in playing the instrument.

What I claim is:
1. A musical typewriter comprising:
 (a) a rectangular frame having parallel side walls, a rear wall and a front wall, said side walls having upward extensions adjacent the rear wall,
 (b) a roller supported between said extensions for receiving a music instruction sheet having parallel staves printed thereon, each staff having notes thereon identified by a predetermined code, said roller being manually rotatable selectively to present one of said staves to the view of a player,
 (c) a row of xylophone bars of varying length supported at an inclined position within said frame in front of said roller below the selected stave, said bars having code indicia thereon,
 (d) a row of keys pivotally supported within said frame adjacent the front wall thereof, each key having a foot portion which swings upwardly when the key is depressed, said keys having code indicia thereon, whereby a player reading the coded notes on the staff presented to his view is able to strike the appropriate keys to play the music on the sheet received in said roller, and
 (e) a row of clappers pivotally supported within said frame intermediate said bars and keys, each clapper including a head mounted on an arm having a forearm portion lying on the foot portion of the associated key, whereby when a key is tapped said head is caused to strike the corresponding bar.

2. A musical typewriter as set forth in claim 1, wherein said bars are provided with a pair of spaced holes and are mounted on a plate having studs which enter said holes, said studs being anchored in rubber rings.

3. A typewriter as set forth in claim 2, wherein said plate is mounted between the leading edge of said upward extension to define with the rear and side walls of said frame, a resonator chamber for the bars mounted thereon.

4. A musical typewriter as set forth in claim 1, wherein the notes on said instruction sheet are color coded, and wherein said bars and said keys are similarly color coded.

5. A musical typewriter as set forth in claim 1, wherein said row of bars is made up of eight bars forming an octave, and said row of keys and said row of clappers have a corresponding number of elements.

References Cited
UNITED STATES PATENTS

| | | | |
|---|---|---|---|
| 2,159,491 | 5/1939 | Rose | 84—404 |
| 3,195,390 | 7/1965 | Glass et al. | 84—404 |
| 3,229,021 | 1/1966 | Baschet | 84—404 |
| 1,285,299 | 11/1918 | Marx | 84—404 |
| 2,221,143 | 11/1940 | Lang | 84—478 |
| 3,093,911 | 6/1963 | Hagelstein et al. | 84—404 |

RICHARD B. WILKINSON, Primary Examiner

L. R. FRANKLIN, Assistant Examiner

U.S. Cl. X.R.

35—5; 46—175; 84—471